Jan. 8, 1952    B. E. FRANK ET AL    2,582,025
TUBE CUTTING APPARATUS
Filed Aug. 27, 1949    6 Sheets-Sheet 1

INVENTORS
BERNARD E. FRANK
JOHN W. ARMSTRONG
GEORGE E. HISTED
BY
THEIR ATTORNEYS

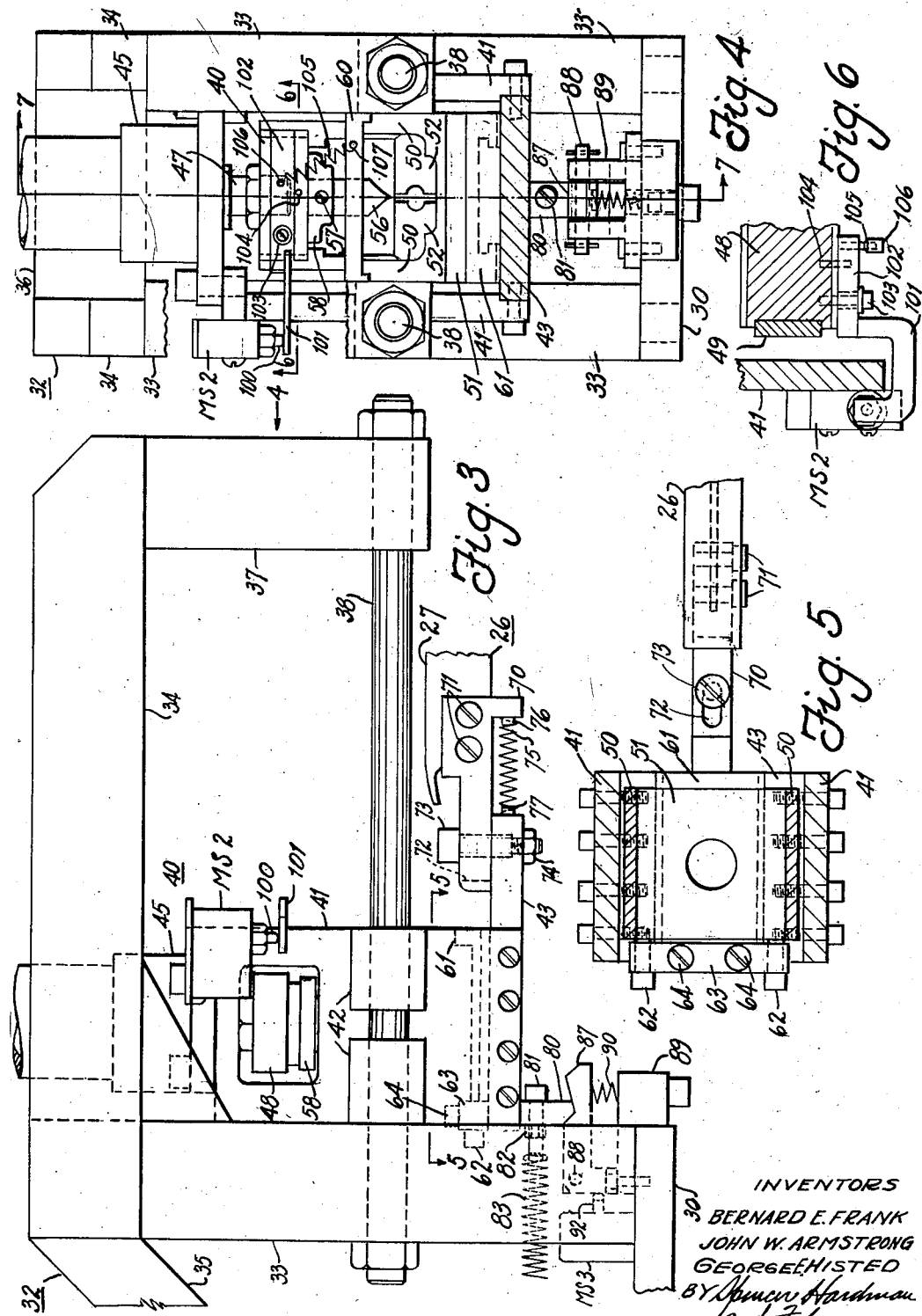

Jan. 8, 1952  B. E. FRANK ET AL  2,582,025
TUBE CUTTING APPARATUS
Filed Aug. 27, 1949  6 Sheets-Sheet 3
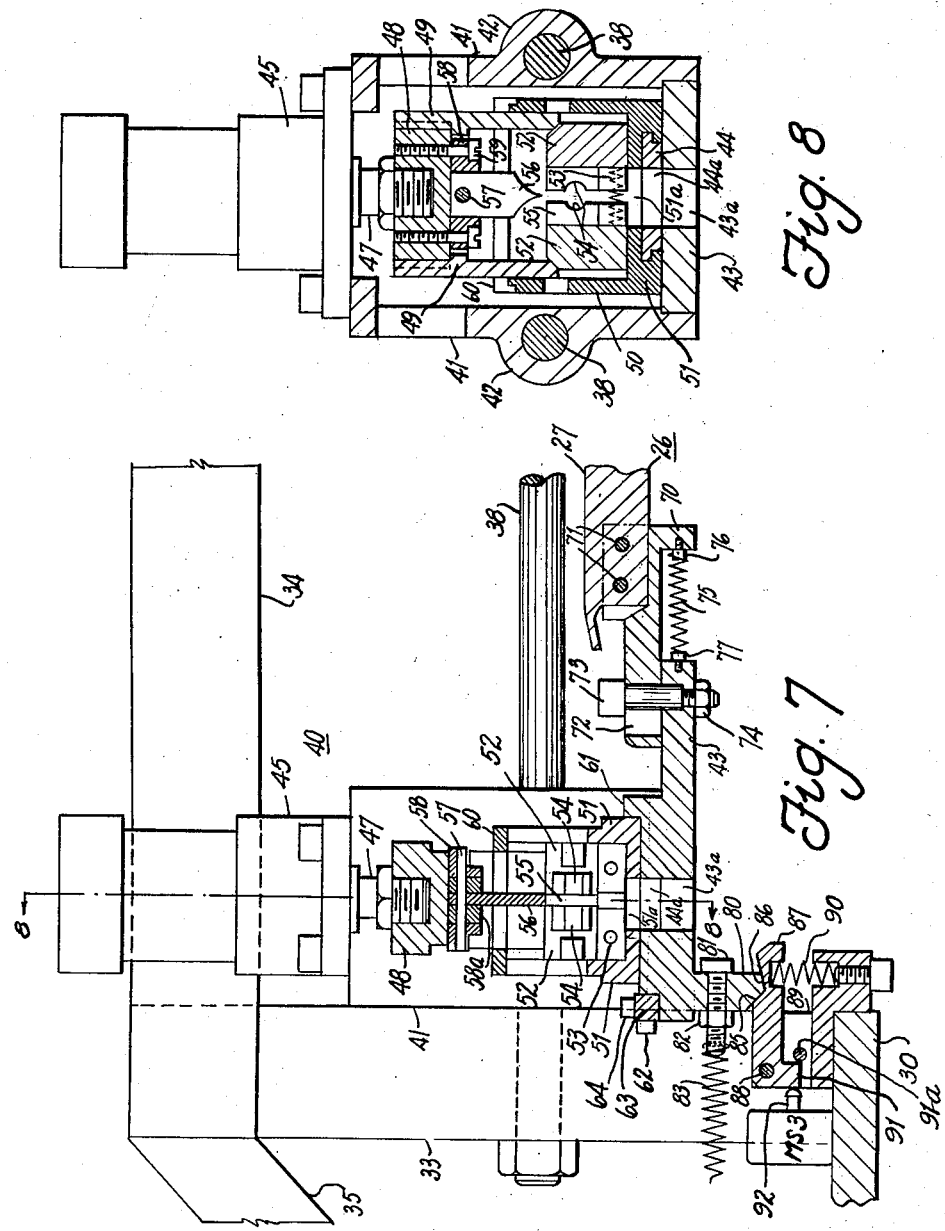
INVENTORS
BERNARD E. FRANK
JOHN W. ARMSTRONG
GEORGE E. HISTED
BY Spencer Hardman & Fehr
THEIR ATTORNEYS

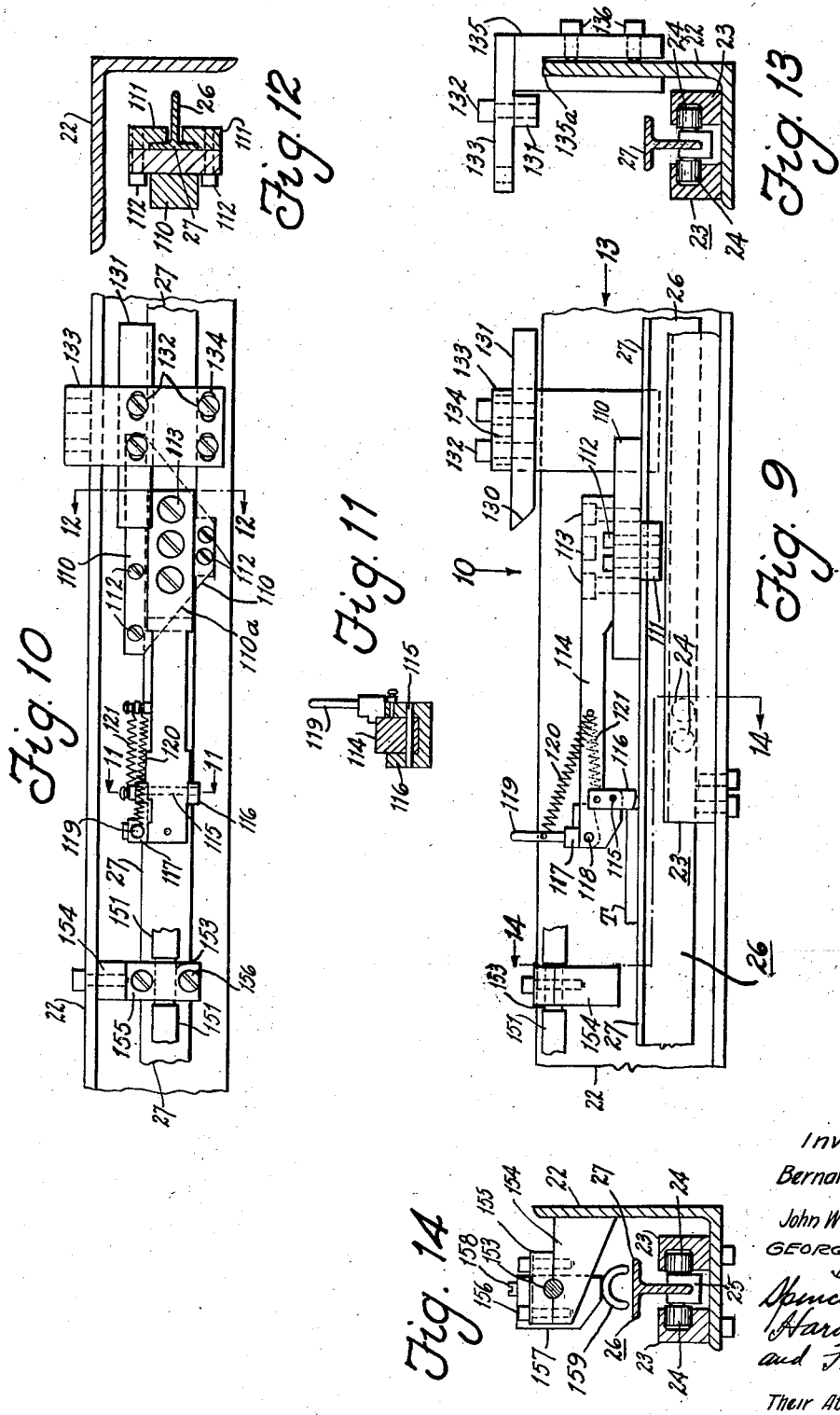

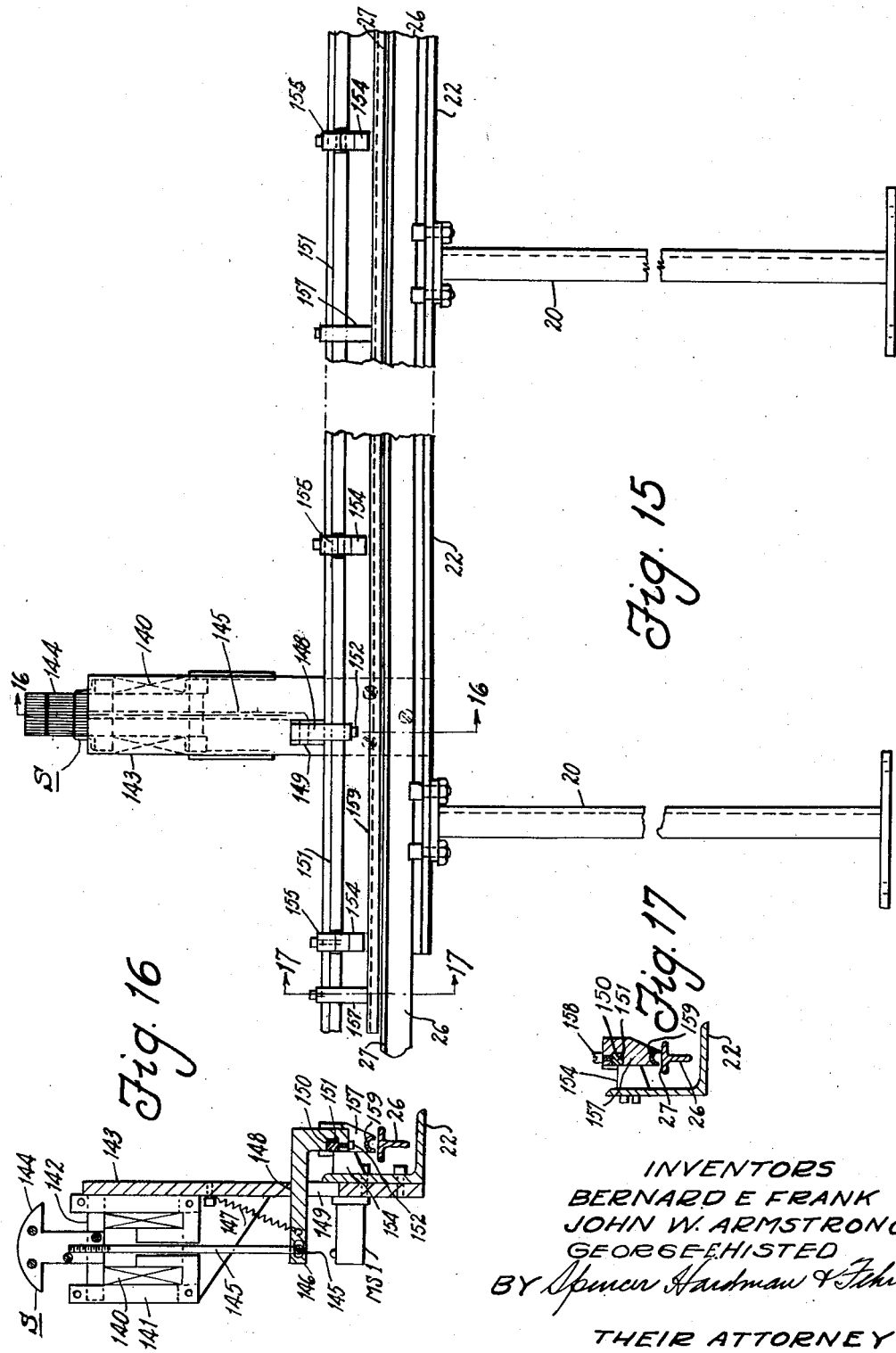

Patented Jan. 8, 1952

2,582,025

UNITED STATES PATENT OFFICE 2,582,025

TUBE CUTTING APPARATUS

Bernard E. Frank, John W. Armstrong, and George E. Histed, Rochester, N. Y., assignors to General Motors Corporation, Detroit, Mich., a corporation of Delaware Application August 27, 1949, Serial No. 112,794

4 Claims. (Cl. 164—48)

1

This invention relates to apparatus for cutting tubing into lengths.

An object of this invention is to provide a machine for cutting tubing into uniform lengths without stopping longitudinal motion of the tubing and which is operative independently of the speed of travel of the tubing within a wide range of limits. To accomplish this object, the machine comprises a bar along which the tubing moves into engagement with an abutment adjustable along the bar to determine the length of tubing. The bar which is mounted for free movement is picked up by the tubing. After motion of the bar has started, it picks up the cutter unit which is likewise mounted for free movement against the action of a restoring spring which is a long spiral spring having a low rate of build up. Thus the cutter unit is started into motion with the tubing and thereafter is caused to sever the tubing while moving with it at tubing speed.

Further objects and advantages of the present invention will be apparent from the following description, reference being had to the accompanying drawings wherein a preferred embodiment of the present invention is clearly shown.

In the drawings:

Figs. 1 and 2 together constitute a side view of the apparatus, said view being somewhat diagrammatic in character since these figures are drawn to a small scale.

Fig. 3 is a fragmentary side view of the cutter unit and its support drawn to a larger scale than Figs. 1 and 2.

Fig. 4 is a view in the direction of arrow 4 of Fig. 3.

Fig. 5 is a sectional view on the line 5—5 of Fig. 3.

Fig. 6 is a sectional view on the line 6—6 of Fig. 4.

Fig. 7 is a sectional view on the line 7—7 of Fig. 4.

Fig. 8 is a sectional view on the line 8—8 of Fig. 7.

Fig. 9 is a view on the larger scale of parts at the region 9 of Fig. 2.

Fig. 10 is a view in the direction of arrow 10 of Fig. 9.

Fig. 11 is a sectional view on the line 11—11 of Fig. 10.

Fig. 12 is a sectional view on the line 12—12 of Fig. 10.

Fig. 13 is a view in the direction of arrow 13 of Fig. 9.

Fig. 14 is a sectional view on the line 14—14 of Fig. 9.

2

Figure 1:
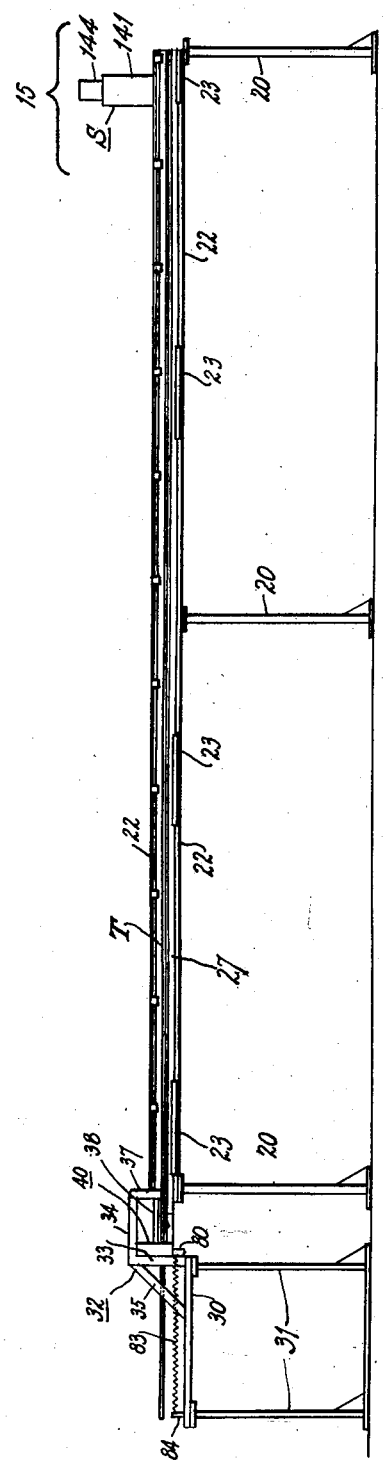

Fig. 15 is a fragmentary side view of parts in the region 15 of Fig. 1.

Fig. 16 is a sectional view on the line 16—16 of Fig. 15.

Fig. 17 is a sectional view on the line 17—17 of Fig. 15.

Figure 18:
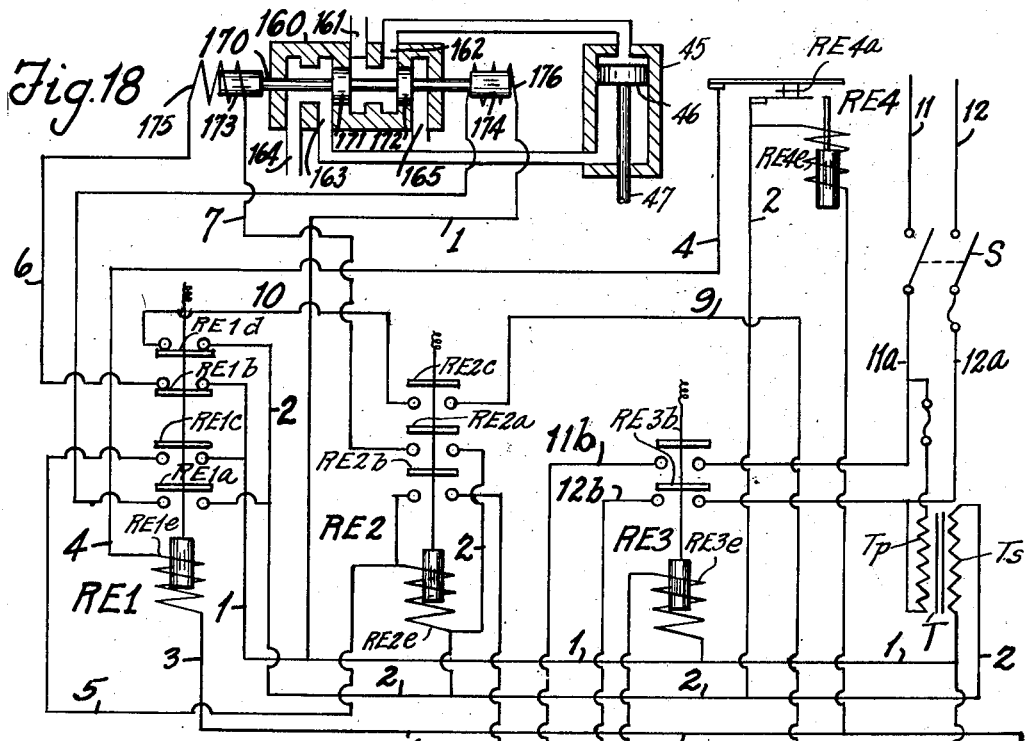

Fig. 18 is a wiring diagram of controls; and

Figure 19:
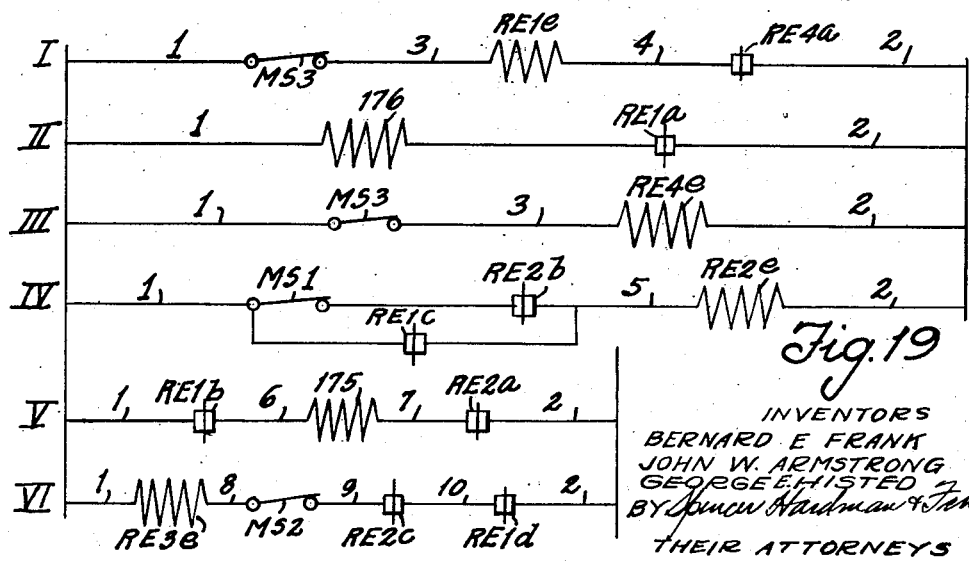

Fig. 19 is a simplified wiring diagram used in explaining Fig. 18.

Figure 2:
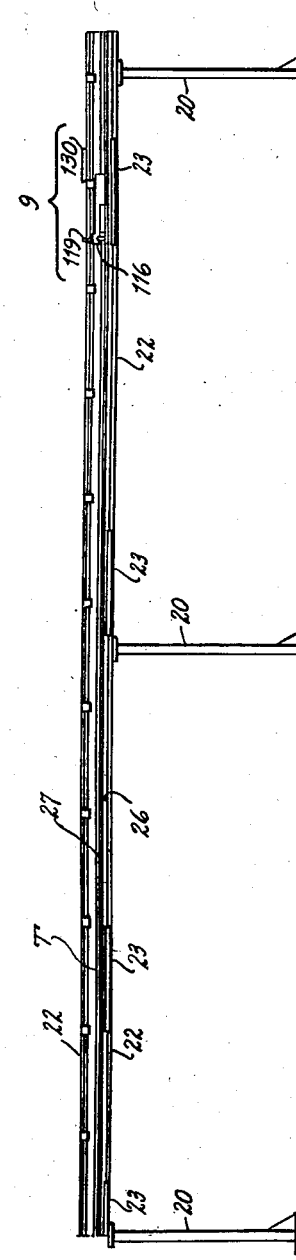

Referring to Figs. 1 and 2, a plurality of posts 20 support above the floor indicated by line 21 an angle bar 22 which is shown in larger scale (Figs. 15, 16 and 17) and still larger scale in Figs. 9 to 14. The bottom flange of angle 22 supports bearing tracks 23 arranged in pairs as shown in Fig. 14. Each pair of tracks receives rollers 24 pivoted on trunnions extending from a bracket 25 which is attached to a T-bar 26, the upper flange 27 of which receives the tubing T.

Referring to Fig. 1, there is a table 30 supported above the floor by legs 31. The table supports a bracket 32, which, as shown in Figs. 3, 4 and 7, comprises posts 33 attached to horizontal bars 34 and inclined bracing bars 35 which, as shown in Fig. 1, are attached to table 30. A cross bar 36 connects the horizontal bars 34 from which bars 37 are suspended. Bars 37 and 33 support rods 38 along which cutter unit 40 is slidable.

The cutter unit 40 comprises side frames 41 which, as shown in Figs. 3 and 8, have bosses 42 which receive the rods 38. Frames 41 support a cylinder 45 which, as shown in Fig. 18, receives a piston 46 connected by a rod 47 (Fig. 8) with a block 48 which supports cam bars 49 slidable between the side walls 50 of a frame 51 and clamps 52 urged apart by springs 53 and having surfaces 54 adapted to grip the tubing. Clamps 52 are notched at 55 to receive a blade 56 attached by a pin 57 to a collar 58 which screws 59 attach to the block 48. Spacers 58a locate the blade 56 centrally of the collar. Frame walls 50 are connected by plate 60.

Frames 41 are secured to a base 43 supporting a plate 44 along which the frame 51 is slidable into engagement with a lug 61 (Fig. 7) against which the frame 51 is clamped by screw 62 threaded through a bar 63 which screws 64 attach to frame 51. When the block 48 is caused to move down by the piston 46 in cylinder 45, the clamps 52 engage the tubing and the blade 56 shears the tubing. The sheared metal parts drop through holes 51a, 44a and 43a in parts 51, 44 and 43 respectively. When the piston and cylinder 45 ascend the blade 56 is retracted and the springs 53 retract the clamps 52.

The cutter unit 40 is connected with the T-bar 26 by means providing for lost motion and comprising a bar 70 which screws 71 attach to the vertical flange of the T-bar 26 and which is provided with a slot 72 receiving a screw 73 threaded through the base 43 and secured by a nut 74. A spring 75 whose ends are attached to screws 76 and 77 threaded into bar 70 and base 43, respectively, operates under tension to urge the bar 70 toward the left to pull it against stud 73.

Base 43 has a lug 80 supporting a screw 81 retained by a nut 82 and connected with a spring 83 which, as shown in Fig. 1, is attached to a post 84 supported by table 30. Spring 83 urges the cutter unit 40 toward the left (Fig. 7) said motion being arrested by engagement of frames 41 with the posts 33. Lug 80 has surfaces 85 and 86 for engaging similarly inclined surfaces of a lever 87 pivoted on a pin 88 supported by a bracket 89 attached to table 30. Lever 87 is urged upwardly by spring 90 and has a part 91 for engaging the plunger 92 of a switch MS3.

In a manner to be described, the cutter unit 40 is caused to move right. During this movement the lever 87 moves clockwise to cause switch MS3 first to close by left movement of plunger 92 (Fig. 7). Further right movement of unit 40 results in retraction of the lug 80 from the lever 87; and switch MS3 opens.

A switch MS2 (Figs. 3, 4 and 6) has a plunger 100 normally held upwardly by a bar 101 (Fig. 6) attached to a bar 102 pivoted on a screw 103 threaded into block 48 and urged clockwise against a pin 104 by a spring 105 connected with a stud 106 carried by bar 102 and with a stud 107 carried by bar 60. As the blade moves down plate 101 releases the plunger of the switch MS2 to allow it to open. At the end of the upward movement of blade 56, switch MS2 is closed.

Referring to Figs. 9–12, a plate 110 supported by T-bar 26 is secured to this bar in the desired position by a clamp 111 threadedly engaged by screws 112 passing through the bar 110. To the bar 110, screws 113 secure a bracket 114 which, as shown in Fig. 11, supports a rod 115 providing a pivot for a U-shaped abutment member 116 adapted to be engaged by the free end of tubing T. The member 116 is retained in vertical position as shown in Fig. 9 by a latch 117 pivoted on a pin 118 supported by the bracket 114. Latch 117 carries a rod or handle 119 which a spring 120 connects with the bracket 114 thereby urging the latch 117 into position for retaining the abutment 116. Abutment 116 is urged into a vertical position by a spring 121 connected with said abutment and with the bracket 114.

The tubing T is moved toward the right through the cutter unit 40 and upon the upper surface 27 of the T-bar 26 by any suitable power driven mechanism, not shown. When the tubing T engages the abutment member 116 it cannot then move counterclockwise on its pivot 115. Therefore the bracket 114 and the T-bar 26 move with the tubing. When the T-bar 26 moves toward the right in Fig. 7 the lost motion between the bar 70 and the stud 73 is taken up in one direction so that, when the left end of slot 72 engages the stud 73, the cutter unit 40 starts moving. While the T-bar 26 and the cutter unit 40 are moving together the piston 46 in cylinder 45 is caused to descend to effect clamping the tubing and to cut it and then to retract through the medium of the control devices to be described.

After the cutting operation, the rod 119 engages a camming surface 130 (Fig. 9) provided by a bar 131 which is attached to a plate 133 by screws 132 threaded into bar 131 and passing through slots 134 in plate 133 so that an adjustment can be made between the bar 131 and the plate 133. Plate 133 is integral with a bracket 135 (Fig. 13) having a notch 135a for receiving a flange of angle bar 22. Screws 136 attach the bracket 135 to bar 22 in the desired position of adjustment. Engagement of the rod 119 with the bar 131 causes the latch 117 to be retracted from the abutment 116 so that the latter can turn counterclockwise against the action of spring 121, thus allowing the tubing T, which has been cut and is being moved by the on-coming uncut tubing, to move free of connection with the T-bar 26 against a beveled surface 110a of plate 110 thereby assisting in the ejection of the cut tubing.

The ejection of the tubing is effected by solenoid S (Figs. 15 and 16) which comprises a magnet coil 140 received by a laminated core 141 supported by a bracket 142 carried by a plate 143 attached to angle 22. When coil 140 is energized, a laminated solenoid armature 144 is caused to move down and effect, through a rod 145, counterclockwise movement of lever 146 against the action of restoring spring 147 which holds the lever against the surface 148 at the upper end of a slot 149 through which lever 146 extends. Lever 146 has a notch 150 for receiving a square shaft 151 to which the lever 146 is attached by a screw 152. The shaft 151 has cylindrical journal portions 153 (Fig. 14) which are journaled in bearings provided by brackets 154 attached to bar 22 and covers 155 secured to the brackets by screws 156. Bar 151 is received by notches in lever 157 (Fig. 17) which are secured to the bar by clamp screws 158. Levers 157 are connected by welding with an inverted U-shaped channel 159 which straddles the tubing T as it passes along the T-bar 26. Consequently downward movement of armature 144 (Fig. 16) and counterclockwise movement of lever 146 and levers 157 cause right movement of the cut tubing and ejection thereof from the T-bar 26.

Referring to Fig. 18, wires 11 and 12 connected with a suitable source of alternating current are connected by manually operated switch S with wires 11a and 12a which are connected by contacts of relay RE3 with wires 11b and 12b connected with eject solenoid winding 140. Wires 11a and 12a are connected with primary winding Tp of transformer T whose secondary winding Ts is connected with wires 1 and 2 which supply current for operating relays RE1, RE2, RE3 and RE4. Relay RE4 is a time delay relay providing for lag separation of its contact RE4a a certain time after its coil RE4e is connected with wires 1 and 2.

The flow of pressure fluid into the ends of the cylinder 45 is controlled by valve having a fixed member 160 and a movable member 170. Member 160 has a pressure fluid inlet port 161 and outlet ports 163 and 162 connected with cylinder 45 and drain ports 164 and 165 connected with the tank from which the pressure fluid is withdrawn by a pump connected with port 161. The movable valve 170 has lands 171 and 172 for controlling distribution of pressure fluid to the ports 162 and 163. As shown, port 161 is connected with port 162 to effect downward movement of piston 46. The member 170 is connected with armatures 173 and 174 attracted respectively by coils 175 and 176 when energized.

The operation of the circuit will now be explained with reference to Fig. 19. When the cutter unit starts moving right due to engagement of the tubing with the abutment member, switch MS3 is momentarily closed and the circuit I is established as follows: Wire 1, switch MS3, wire 3, coil RE1e, wire 4 normally closed contacts RE4a of relay RE4 and wire 2. Contacts RE1d and RE1b of relay RE1 are opened and contacts RE1c and RE1a are closed. Circuit II is established as follows: Wire 1, coil 176, contacts RE1a, wire 2. Coil 176 being energized, valve 170 moves into the position shown in Fig. 18 and piston 46 moves down to effect the cutting of the tubing.

Referring to circuit IV, the closing of relay contacts RE1c effects energization of coil RE2e of relay RE2 through the following circuit: Wire 1, contacts RE1c, wire 5, coil RE2e and wire 2. Energization of coil RE2c causes closure of contacts RE2b so that this coil remains energized independently of contacts RE1c through the following circuit: Wire 1, switch MS1 normally closed, contacts RE2b, wire 5, coil RE2e and wire 2. After the latter circuit has been established contacts RE1c open due to the fact that coil RE1e of relay RE1 has become deenergized by opening of contacts RE4a of relay RE4 which had become energized when switch MS3 closed through circuit III as follows: Wire 1, switch MS3, wire 3, coil RE4e and wire 2. Since relay RE4 is a time-delay relay, contacts RE4a do not open until after coil RE2e has been energized and has closed contacts RE2b. When switch MS3 opens again during right movement of the cutter unit, coil RE4e is open circuited and contacts RE4a close a certain time thereafter.

Since coil RE2e remains energized after contacts RE1c are opened circuit V is completed as follows: Wire 1, contacts RE1b of relay RE1, wire 6, coil 175, wire 7, contacts RE2a of relay RE2 and wire 2. Since coil 176 has been open-circuited by separation of the contacts RE1a of relay RE1, when coil 175 is energized valve 170 moves left from the position shown in Fig. 18 to effect connection of the pressure source with the lower end of cylinder 145 and the connection of its upper end with drain. Therefore, the piston 46 moves up to retract the clamps and the blade of the cutter unit. When the piston 46 has arrived at its uppermost position, switch MS2 is closed and circuit VI is established as follows: Wire 1, coil RE3e of relay RE3, wire 8, switch MS2, wire 9, contacts RE2c of relay RE2, wire 10, contacts RE1d of relay RE1, wire 2. Relay RE3 then operates to connect the eject solenoid coil 140 with wires 11a and 12a (then connected with wires 11 and 12) so that ejection of the cut tubing is effected. Downward movement of the solenoid armature 144 causes the switch MS1 to open thereby open circuiting the coil RE2e so that the contacts of relay RE2 remain open until relay coil RE1e is energized again at the beginning of the next cycle.

Ejection of the cut tubing releases the abutment member from connection with the oncoming uncut tubing so that the cutter unit and the T-bar are caused to move left by spring 83. The left movement of the cutter unit is so rapid that, although switch MS3 is momentarily closed, the time of closure is so brief that relay RE1 does not effect closure of contacts RE1a before switch MS3 opens. Coil RE4e of relay RE4 is open circuited at the end of the left movement of the cutter.

Switch MS1 having been opened by downward movement of the eject solenoid armature, coil RE2e is open circuited and contacts RE2c are opened and relay coil RE3c is deenergized and eject solenoid coil 140 is open circuited. The ejector is returned by spring 147 to normal status. Since contacts RE2b are open, closure of switch MS1 in response to upward movement of the eject solenoid armature will not cause coil RE2e to be reenergized and, therefore, coil RE3e remains open circuited when switch MS1 recloses. Consequently at the end of the cycle, all relays are de-energized preparatory to the starting of a succeeding cycle by engagement of the tubing with the abutment member 116 immediately followed by right movement of the cutter unit and momentary closure of switch MS3.

While the embodiment of the present invention as herein disclosed, constitutes a preferred form, it is to be understood that other forms might be adopted.

What is claimed is as follows:

1. Apparatus for cutting tubing into lengths while moving longitudinally comprising a cutter unit through which the tubing moves longitudinally and having means for clamping the tubing, a blade for severing the tubing while clamped and a fluid pressure motor for operating the clamping means and the blade, means supporting the cutter unit for movement with the tubing, a member supporting the tubing as it passes from the cutter unit and connected with the cutter unit, means supporting the member for movement with the tubing, an abutment carried by the member, a latch normally retaining the abutment in the path of movement of the tubing, movement of the tubing supporting member and the cutter unit with the tubing resulting from engagement of the tubing with the abutment, means responsive to initial movement of the cutter unit from starting position for causing operation of the motor whereby the cutter blade advances to cut the tubing and then retracts, means for retracting the latch upon movement of the abutment by the tubing a certain distance, means for ejecting the severed piece of tubing and means for returning the cutter unit to starting position, in which the cutter blade motor is controlled by first and second solenoids the energization of which effects, respectively, advancing and retracting movements of the cutter blade, in which, during movement of the cutter unit with the tubing, a switch is momentarily closed to effect energization of the first solenoid whereby the blade advances and to effect the starting of energization of a time delay relay which becomes effective after the blade has advanced to effect deenergization of the first solenoid, and in which there are means for causing energization of the second solenoid concurrently with deenergization of the first solenoid, a third solenoid for operating the ejector and means responsive to retraction of the cutter blade for effecting operation of the third solenoid.

2. Apparatus for cutting tubing into lengths while moving longitudinally comprising a cutter unit through which the tubing moves longitudinally and having means for clamping the tubing, a blade for severing the tubing while clamped and a fluid pressure motor for operating the clamping means and the blade, means supporting the cutter unit for movement with the tubing, a member supporting the tubing as it passes from the cutter unit and connected with the cutter unit, means supporting the member for movement with the tubing, an abutment carried by the member, a latch normally retaining the abutment in the path of movement of the tubing, movement of the tubing supporting member and the cutter unit with the tubing resulting from engagement of the tubing with the abutment, means responsive to initial movement of the cutter unit from starting position for causing operation of the motor whereby the cutter blade advances to cut the tubing and then retracts, means for retracting the latch upon movement of the abutment by the tubing a certain distance, means for ejecting the severed piece of tubing and means for returning the cutter unit to starting position; in which the cutter blade motor is controlled by first and second solenoids the energization of which effects, respectively, advancing and retracting movements of the cutter blade, in which there is a third solenoid for operating the tubing ejector; in which there are first, second, third and fourth relays, the latter being a time delay relay, in which there are first, second and third switches, the first switch being a normally closed switch which is opened when the ejector operates, the second switch being a normally open switch which is closed by retraction of the blade, the third switch being a normally open switch which is closed momentarily during movement of the cutter unit with the tubing, and circuits making connections with a current source as follows: a first circuit including the third switch, magnet coil of the first relay and normally closed contacts of the fourth relay; a second circuit including the first solenoid and normally open contacts of the first relay; a third circuit including the third switch and the magnet coil of the fourth relay; a fourth circuit including magnet coil of the second relay and normally closed contacts of the first relay and, in shunt with the latter, the first switch in series with normally open contacts of the second relay; a fifth circuit including the second solenoid, normally closed contacts of the first relay and normally open contacts of the second relay; a sixth circuit including the magnet coil of the third relay, the second switch, normally open contacts of the second relay and normally closed contacts of the first relay; and a circuit connecting the third solenoid with a current source upon energization of the magnet coil of the third relay.

3. Apparatus for cutting tubing into lengths while moving longitudinally, a cutter unit mounted for movement with the tubing from a starting position and having a tubing severing blade past which the tubing moves longitudinally, an abutment member connected with the cutter unit and normally located in the path of movement of the moving tubing whereby said abutment member is engaged by the tubing and moves the cutter unit with the tubing after engagement of the abutment member by said tubing, mechanism rendered effective after the cutter unit is moving with the tubing for causing the blade to sever the tubing while the cutter is moving therewith, a latch for normally holding the abutment member in position to be engaged by the tubing, means operable in response to movements of the tubing for disengaging the latch from the abutment member after completion of the cutting operation to permit return of the cutter unit to normal position, means for returning said cutter unit, means for ejecting the severed tubing from the apparatus, and means responsive to operation of the tube severing device for controlling the operation of the ejecting means.

4. Apparatus for cutting tubing into lengths while moving longitudinally comprising a cutter unit through which the tubing moves longitudinally and having means for clamping the tubing, a blade for severing the tubing while clamped and a fluid pressure motor for operating the clamping means and the blade, means supporting the cutter unit for movement with the tubing, a member supporting the tubing as it passes from the cutter unit and connected with the cutter unit, means supporting the member for movement with the tubing, an abutment member connected with the cutter unit and carried by said member, a latch normally holding said abutment member in the path of movement of said tubing whereby it is engaged by the tubing and movement of the latter will effect movement of the supporting member and cutter unit with the tubing, means responsive to the initial movement of the cutter unit from its starting position for causing operation of the fluid pressure motor to effect movement of the cutter blade on its cutting stroke and retraction thereof, means operable in response to movement of the tubing through a certain distance for releasing the latch from the abutment member to permit return of the cutter unit to its normal position after completion of the cutting operation, means for ejecting the severed tubing from the apparatus, and means responsive to operation of the tube severing apparatus for controlling the operation of said ejecting means.

BERNARD E. FRANK.
JOHN W. ARMSTRONG.
GEORGE E. HISTED.

REFERENCES CITED

The following references are of record in the file of this patent:

UNITED STATES PATENTS

| Number | Name | Date |
|---|---|---|
| 1,800,005 | Braun | Apr. 7, 1931 |
| 2,133,542 | Jensen | Oct. 18, 1938 |
| 2,278,786 | Johnston | Apr. 7, 1942 |